United States Patent Office 2,849,977
Patented Sept. 2, 1958

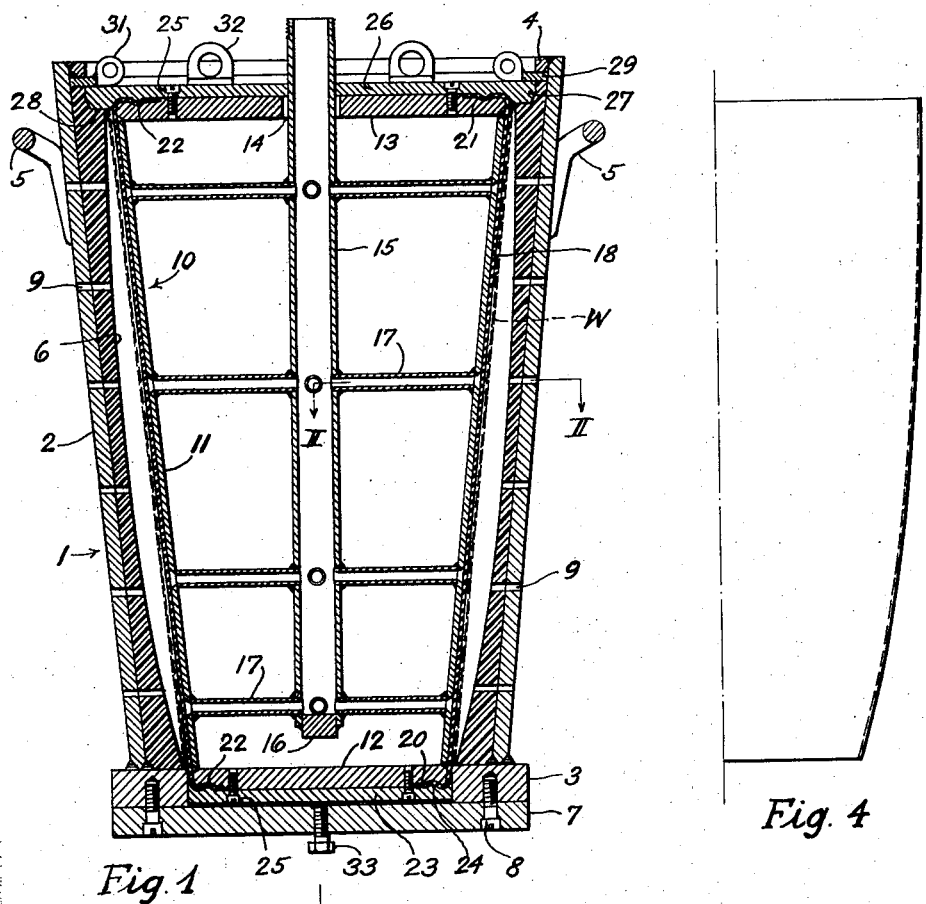
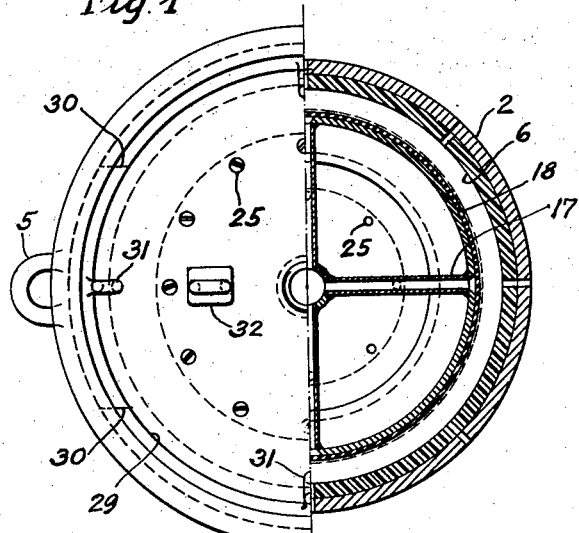
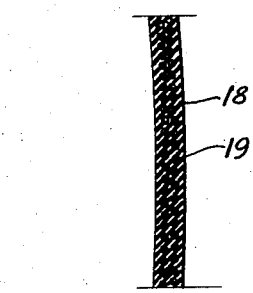
Fig. 1
Fig. 2
Fig. 3
Fig. 4
INVENTORS,
James S. Nielsen,
Robert A. Shannon, Jr.

2,849,977

MOLD FOR FORMING MULTICURVED SHEET METAL TANK SECTIONS

James S. Nielsen, Wadsworth, and Robert A. Shannon, Jr., North Canton, Ohio, assignors to Goodyear Aircraft Corporation, Akron, Ohio, a corporation of Delaware Application March 11, 1955, Serial No. 493,668

2 Claims. (Cl. 113—44)

This invention relates to the construction of a mold for fabricating sheet metal bodies having a streamlined surface, such as airplane wing fuel tanks and the like and in particular to the improvement of a mold for such purpose which is operated by pressurized hydraulic fluid applied against a diaphragm in contact with a work piece to be formed.

Heretofore, it has been known to mold-form such articles by first preforming from sheet metal a work piece in the shape of a cone frustum which, placed into a female mold having the desired tank curvature, was pressed against the mold by means of an expandable bag completely filled with hydraulic fluid put under pressure. However, in this case, the forming of each article required filling and emptying the bag, a procedure rather cumbersome and time consuming.

It is the general object of the invention to avoid and overcome the foregoing and other difficulties of and objections to prior art practices by the provision of a male mold consisting of a rigid hollow support covered by an elastic diaphragm and fitting loosely into the tapered work piece to displace to the greatest extent possible the space within the female mold, in order, to reduce to a minimum the volume of hydraulic fluid required.

Another object of the invention is to return after a forming process all hydraulic fluid between the elastic diaphragm and its support into the fluid supply ducts and to keep the weight of the male mold as low as possible when removing it from the female mold.

Another object of the invention is to provide the rigid male mold support with a diaphragm which is substantially nonexpandable longitudinally but resiliently expandable circumferentially.

The aforesaid objects of the invention and other objects which will become apparent as the description proceeds are achieved by using in cooperation with a rigid female mold, contoured to the outer surface of an article to be formed, an expandable flexible male mold consisting of a rigid hollow support in the shape of a cone frustum covered by a diaphragm of elastic material secured and sealed at both ends to the support. The diaphragm is, preferably, reinforced longitudinally thereof with at least one layer of fibrous cords embedded therein to restrict extensibility of the diaphragm in such direction, however, without preventing expansion circumferentially thereof. Within the support is arranged a duct system for applying pressurized hydraulic fluid against the diaphragm to radially expand the work piece in the shape of a preformed cone frustum of sheet material towards the female mold into the desired article.

For a better understanding of the invention reference should be had to the accompanying drawing, wherein Fig. 1 is a vertical diametrical cross-sectional view of one embodiment of the invention.

Fig. 2, left half, is a top view thereof and the right half a cross-sectional view taken on line II—II of Fig. 1.

Fig. 3 is a fragmental cross-sectional view in larger scale of the diaphragm structure, also taken on line II—II of Fig. 1.

Fig. 4 is a half side view of an article formed in the mold, according to the invention.

With specific reference to the form of the invention illustrated in the drawing the numeral 1 indicates, in general, a female mold of which 2 is a sheet metal casing having the shape of a cone frustum, provided at the bottom with an annular flange 3 and at the top with a retaining ring 4, both parts being welded thereto. A pair of lifting eyes 5 is attached to the outside of the casing 2 near the top thereof for easy handling of the mold. The casing 2 is provided at its inside with a lining 6 made of plastics, preferably, epoxy resin, and shaped to the contour of a particular tank section required. Usually, fuel tank shells or similar containers, having streamline shape, are made up of two or more sections which are welded together. The casing 2 is closed at the bottom by a disk 7 secured by screws 8 to the flange 3, and sufficient vent holes 9, suitably spaced from each other, pass through the casing 2 and its lining 6.

In order to produce such tank sections in shortest time and more economically than has been possible prior to this invention the work piece W is formed in the female mold 1 by an expandable male mold 10, indicated as a whole. The male mold 10 consists of a hollow cone frustum 11, preferably, made of sheet steel, the bottom of which is closed by a plate 12 and the top by a plate 13 provided with a hole 14. Both plates are welded to the cone frustum 11 within which is mounted a Christmas-tree hydraulic fluid duct system, including a main duct 15 closed at the bottom by a plug 16 and threaded at the top to be attached to an outside pressure source (not shown). A plurality of distributing ducts 17 extending at various levels radially from the main duct 15 are welded to and open through the cone frustum 11 which is covered by a diaphragm 18 made of natural or synthetic rubber of suitable elasticity. Into the diaphragm 18 is embedded at least one layer of fibre cords 19 running longitudinally of the cone frustum 11 to substantially prevent its stretching in this direction, whereas, circumferentially, the diaphragm is left freely expandable. The bottom and top edges of the diaphragm are folded over the plates 12 and 13, respectively, which have annular portions 20 and 21, respectively, of reduced thickness, including grooves 22 into which fit the folded diaphragm edges. A bottom cover plate 23, provided with an annular bead 24 matching the groove 22, secures the bottom edge of the diaphragm in place by screws 25. Similarly, the top edge of the diaphragm is held down against the top plate 13 by the cover plate 26 secured thereon by screws 25 and having an annular supporting ledge 27 resting on the shoulder 28 of the lining 6. A lock ring 29, split into four parts at 30 and each part being provided with an eye 31 for easy handling, is inserted in the space between the retaining ring 4 and the top of lining 6. The cover plate 26 is provided with a pair of flanged eyes 32 for handling the male mold, and in the center of the disk 7 an adjusting screw 33 serves to tighten the male mold 10 against the lock ring 29. Since the end diameters of the tapered work pieces W are just a little smaller than the corresponding diameters of the female mold 1, the space between work piece and mold is the practically smallest possible. Accordingly, the quantum of pressurized hydraulic fluid required for forming an article is a minimum and can be readily supplied through the large number distributing ducts 17 radiating from the main duct 15. On the other hand, as soon as the pressure is released, the hydraulic fluid is completely returned by the resilient diaphragm 18 into the fluid distributing ducts 17 without adding weight to the male mold 10 so that it can be lifted out without difficulty for inserting a new work piece. Thus, with this arrangement it is possible to operate the mold with one and the same hydraulic fluid.

From the above description it will be recognized that the objects of the invention of simplifying the molding process, including time and labor saving, have been achieved and that the invention is a definite improvement over the prior art.

While certain representative embodiments and details have been shown for the purpose of illustrating the invention, it will be apparent to those skilled in this art that various changes and modifications may be made therein without departing from the spirit or scope of the invention.

What is claimed:

1. In combination with a rigid female mold for forming a cone frustum shaped sheet metal work piece into a streamlined product, a male mold adapted to be removably received inside the female mold, the male mold consisting of a rigid sheet metal supporting shell, a main conduit extending substantially centrally of the male mold and substantially the length thereof, radially-directed conduits branching from the man conduit and at spaced points along the length of the main conduit, said radially-directed conduits being connected to openings extending through the sheet metal shell of the male mold, a resilient conical diaphragm snugly carried by said shell so as to be positioned in contact with the outer surface thereof, said main conduit and radially directed conduits being adapted to supply pressurized hydraulic fluid simultaneously to a number of areas of the inner surface of said diaphragm, said diaphragm returning the pressure fluid to said conduits when the pressure on the fluid is released, a laminated round metal plate cover secured to the bottom of said male mold with an end of said diaphragm secured thereto, a contoured plastic liner carried by said female mold on the inner surface thereof to control the shape of the streamlined product produced, a top cover for said male mold secured thereto, a cover plate for said mold assembly secured to said top cover of said male mold and securing the second end of said diaphragm thereto, and means securing the male mold in the female mold with a relatively thin sheet metal work piece interposed therebetween and with the main conduit positioned for connection to a supply of hydraulic pressure, the adjacent surfaces of the laminations of said bottom cover plate of said male mold and of the said top cover and said cover plate for said mold assembly having complementary ribs and grooves therein, end portions of said diaphragm being clamped between said ribs and grooves.

2. Sheet metal shaping apparatus including a male mold, a female mold, and means releasably securing the molds together, said male mold having top and bottom laminated ends formed of round metal plates of different diameters, a metal plate wrapped into a frusto-cone and joined at its ends to said top and bottom ends, a main conduit extending through the top end, a plurality of conduits connected to the main conduit and joining circumferentially and axially spaced openings in the cone with the main conduit, a frustro-conical resilient diaphragm snugly covering the cone and having its ends secured to and between the laminations of the ends of the male mold, said main conduit and radially directed conduits being adapted to supply pressurized hydraulic fluid simultaneously to a number of areas of the inner surface of said diaphragm, said diaphragm returning the pressure fluid to said conduits when the pressure on the fluid is released, said female mold having a frustro-conical body, a plate closing the lower end of the body, a plastic liner secured to the inside of the body to control the shape of the streamlined product produced, the liner having a concave curve from top to bottom of the body, a top lamination of said top cover also closing said female mold, and means securing said male mold to and within said female mold.

References Cited in the file of this patent

UNITED STATES PATENTS

| | | |
|---|---|---|
| 971,583 | Bell | Oct. 4, 1910 |
| 2,016,569 | Zinser | Oct. 8, 1935 |
| 2,038,304 | Middler | Apr. 21, 1936 |
| 2,178,953 | Chilton | Nov. 7, 1939 |
| 2,298,132 | Johnson | Oct. 6, 1942 |
| 2,325,498 | Floyd | July 27, 1943 |
| 2,458,182 | MacDonald | Jan. 4, 1949 |
| 2,696,184 | Demarest | Dec. 7, 1954 |

FOREIGN PATENTS

| | | |
|---|---|---|
| 353,684 | France | Sept. 18, 1905 |
| 1,056,298 | France | Oct. 21, 1953 |